(12) United States Patent
Steinhauser et al.

(10) Patent No.: US 7,871,354 B2
(45) Date of Patent: Jan. 18, 2011

(54) METHOD FOR INCREASING THE SPONTANEITY OF OVERLAPPING SHIFTING OPERATIONS IN AN AUTOMATIC TRANSMISSION

(75) Inventors: Klaus Steinhauser, Kressbronn (DE); Christian Popp, Kressbronn (DE); Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 367 days.

(21) Appl. No.: 10/584,975

(22) PCT Filed: Dec. 11, 2004

(86) PCT No.: PCT/EP2004/014131

§ 371 (c)(1),
(2), (4) Date: Jun. 30, 2006

(87) PCT Pub. No.: WO2005/065981

PCT Pub. Date: Jul. 21, 2005

(65) Prior Publication Data

US 2007/0129211 A1    Jun. 7, 2007

(30) Foreign Application Priority Data

Jan. 9, 2004    (DE) .................. 10 2004 001 381

(51) Int. Cl.
*B60W 10/04* (2006.01)

(52) U.S. Cl. .................................................. 477/107
(58) Field of Classification Search ................. 477/107, 477/120, 121, 143

See application file for complete search history.

(56) References Cited

U.S. PATENT DOCUMENTS

| 6,254,509 | B1 | 7/2001 | Meyer |
| 6,375,597 | B1 * | 4/2002 | Popp et al. .................... 477/97 |
| 6,740,005 | B2 | 5/2004 | Watanabe et al. |
| 6,749,534 | B2 | 6/2004 | Watanabe et al. |
| 2005/0064991 | A1 | 3/2005 | Benz et al. |

FOREIGN PATENT DOCUMENTS

| DE | 199 28 674 A1 | 12/2000 |
| DE | 199 55 987 A1 | 7/2001 |
| DE | 102 34 439 A1 | 3/2003 |
| DE | 102 35 001 A1 | 4/2003 |
| DE | 103 08 689 A1 | 10/2003 |

\* cited by examiner

*Primary Examiner*—David D Le
*Assistant Examiner*—Derek D Knight
(74) *Attorney, Agent, or Firm*—Davis & Bujold, P.L.L.C.

(57) ABSTRACT

A procedure for increasing the readiness of crossover gearshifts in an automatic transmission which, with the switching command or immediately thereafter, a motor fueling is provided through which a snatch operation of the disengaging switching element and/or an increase of the rotational speed gradient (turbine revolution speed) is achieved.

15 Claims, 4 Drawing Sheets

METHOD FOR INCREASING THE SPONTANEITY OF OVERLAPPING SHIFTING OPERATIONS IN AN AUTOMATIC TRANSMISSION

This application is a national stage completion of PCT/EP2004/014131 filed Dec. 11, 2004 which claims priority from German Application Serial No. 10 2004 001 381.0 filed Jan. 9, 2004.

FIELD OF THE INVENTION

The invention at hand concerns a procedure for increasing the spontaneity of the crossover of gearshifts of an automobile.

BACKGROUND OF THE INVENTION

The always rising demands for the functionality of the automatic transmission through the requirement for more spontaneity, the ever growing number of gears to be switched, the use-optimized design of the automatic transmission with greater portions of the driving in the high gears as well as the large number of gearshifts in to be executed in slowing down the vehicle to standstill, lead to the fact that gears of an automatic transmission are to be shifted ever more rapidly and frequently in succession.

With automatic transmissions, which can include a converter with which gearshifts are executed by way of a crossover gearshift of two clutches or switching elements, if a gearshift is required, a clutch must be hydraulically disengaged and another clutch must be engaged on, whereby dead time and delays here arise, which are perceived as unpleasant.

In addition, with gearshifts in the motor braking a delay of the vehicle occurs, which is caused by the additional demand for kinetic energy for the acceleration of the rotator masses of the motor and transmission during the gear change.

In the Applicant's DE 199 55 987 A1, it is proposed, for increasing the readiness upon a gearshift, to regularly fuel the motor of the vehicle in the motor braking during the transition from a lower to a higher gear, i.e., in a gearshift; in this manner the energy needed for acceleration can be summoned up for the rotator masses by the motor itself.

Thus, the task forms the basis of the invention at hand, starting from the cited state of the art, to specify a procedure for increasing the readiness of crossover shifts in an automatic transmission, which considerably shortens the reaction times of the gearshifts, in particular in the motor braking and in the part load operation.

SUMMARY OF THE INVENTION

Thus, it is proposed for increasing the readiness of a crossover shift in an automatic transmission, upon a switching command or immediately afterwards, to force a motor firing by the gearbox, through which a snatch operation of the disengaging clutch or the switching element or an increase of the rotational speed-gradients (turbine revolution speed) or a combination of both measures is achieved, even though the release pressure switch of the disengaging clutch has not yet advanced so far that the clutch would open or the rotational speed-gradients would be allowed.

In this connection, additional motor fueling can occur both via the presetting of a set rotation speed to be employed and via the presetting of a set motor torque to be employed by the gearbox system.

According to the invention, this approach is applicable in each case up to the maximum achievable full-load curve, however, only a part of the available excess potential can also be used in which this depends on the extent of the increase in readiness to be achieved. The presetting can also be issued through the software parts outside of the transmission system which, however, communicate directly via communication interfaces with the switching procedure software.

Through the conception, according to the invention, both an improvement in the reaction time in the gearshift and an increase in the rotational speed gradient during the gearshift occurs, which leads to a shortening of the contact time and with it of the gear-changing overall. For the driver, this leads thus to a more direct reaction in his drive input and overall in the interplay with the shortened gearshifting to a more spontaneous and sporty impression of the vehicle. A smaller surplus load of the switching element is deliberately put up with, in order to achieve an increase in the readiness.

The opening of the switching element, which keeps the revolution speed at the old synchronous speed, is monitored in this connection for the protection of an unintentional transfer of the additional motor fueling required by the transmission system to the output, in which the motor fueling is interrupted, if an unintentional transfer occurs.

In addition, the opening of this clutch or of the switching element must take place up to a defined time after the start of the additional motor fueling and a corresponding rotational speed gradient must also subsequently be set in a new synchronous speed direction. This can also be assured through the monitoring of a continuously and, to a certain extent, decreasing rotation speed difference to a new synchronous speed. Furthermore, in accordance with the invention the additional motor fueling through the gearbox system, if a further gear-shift is not produced, may not be present beyond a certain duration beyond the achievement of a new synchronous speed.

According to the invention, via different production of the torque signals for the components of the switching procedure, it can be responsive to the correct execution of the additional motor fueling. Thus, if the additional motor fueling actually executed is transferred in the torque input quantity for the clutch to be switched or the switching element to be switched, the clutch to be switched can respond to an additional motor fueling possibly not executed for certain reasons and can facilitate the achievement of the synchronous speed through a pressure increase.

For the disengaging clutch, according to the invention, the additional motor fueling actually executed is not transferred or it is accessed in the torque quantities corresponding to the load status of the driver, since otherwise the gain through the additional motor fueling is reduced again by a pressure reaction in the disengaging clutch.

In the framework of further variations of the procedures, according to the invention, further enhancement possibilities for readiness arise from the combination of measures such as, for example, additional motor fueling, pressure drop in the disengaging clutch and pressure increase in the engaging clutch with corresponding effects on the acceleration processes and the comfort performance.

BRIEF DESCRIPTION OF THE DRAWINGS

The invention will now be described, by way of example, with reference to the accompanying drawings in which.

DETAILED DESCRIPTION OF THE INVENTION

Figure 1:
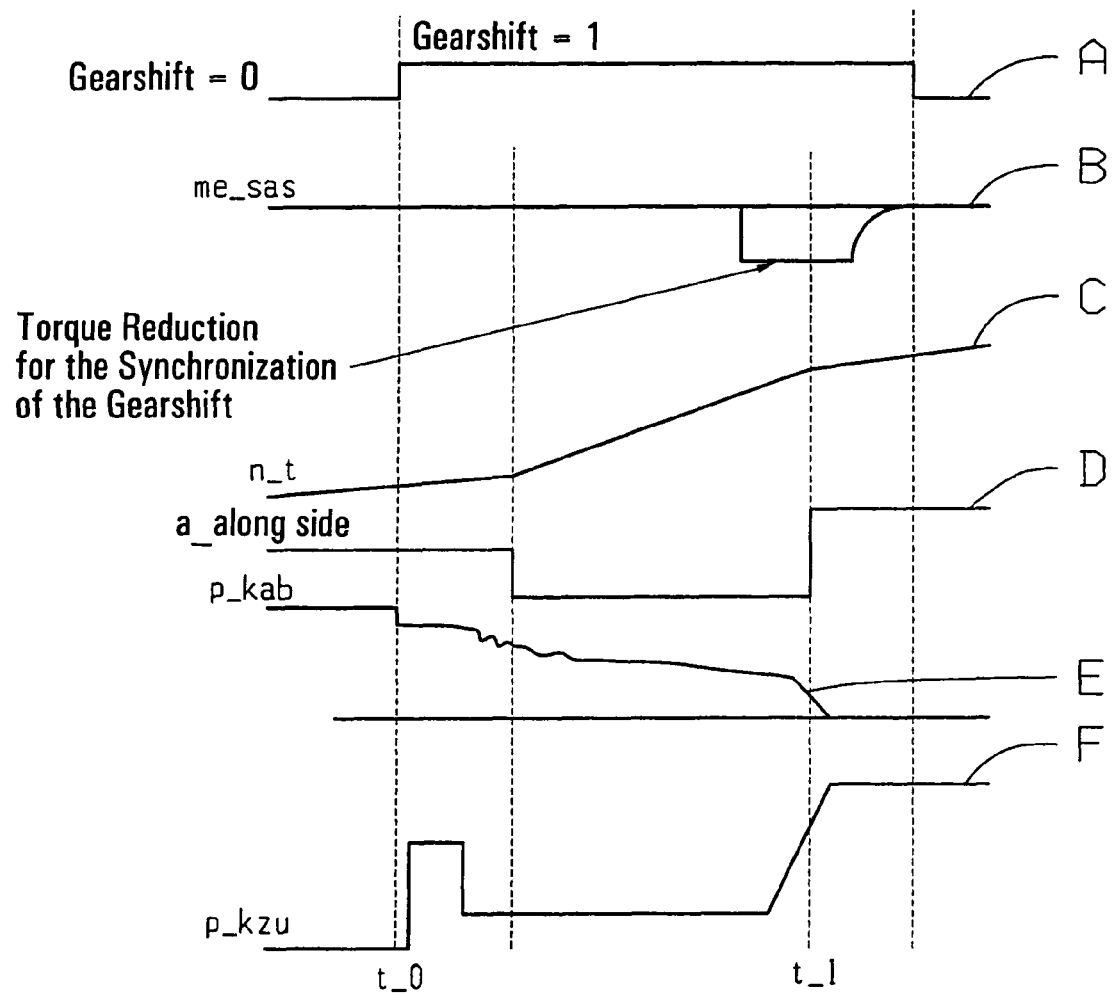
FIG. 1 is a diagram of the process of the revolution speeds and the pressures in a gearshift in the part load operation according to state of the art technology.

In FIG. 1, curve A corresponds to the process of the switching signal, i.e., at the point in time t_0 the gearshift (shift-in) is initiated; curve B corresponds to the current motor torque and curve C corresponds to the gearbox input revolution speed (turbine revolution speed n_t). Furthermore, the process of the longitudinal acceleration of the vehicle is portrayed; after the gearshift, the acceleration is increased. The pressure progressions of the disengaging clutch or of the disengaging switching element and of the engaging switching element are expressed by curve E or F. According to FIG. 1, the pressure of the engaging clutch is increased in a stepwise manner during the gearshift at the outset for a rapid filling; subsequently a decline in the filling balance pressure follows; followed by a ramp-shaped rise in pressure ("closing ramp"), even beyond the synchronous point t_1.

From FIG. 1, it emerges, that the gearshift without the motor fueling, according to the invention, reaches the synchronous point at the point in time t_1 through the torque assumption of the switching on clutch. In accordance with the invention, the switching time can be shortened significantly as a motor firing is provided, so that a snatch operation of the clutch or of the switching element or an increase of the rotational speed gradient or a combination of both measures is obtained.

Figure 2:
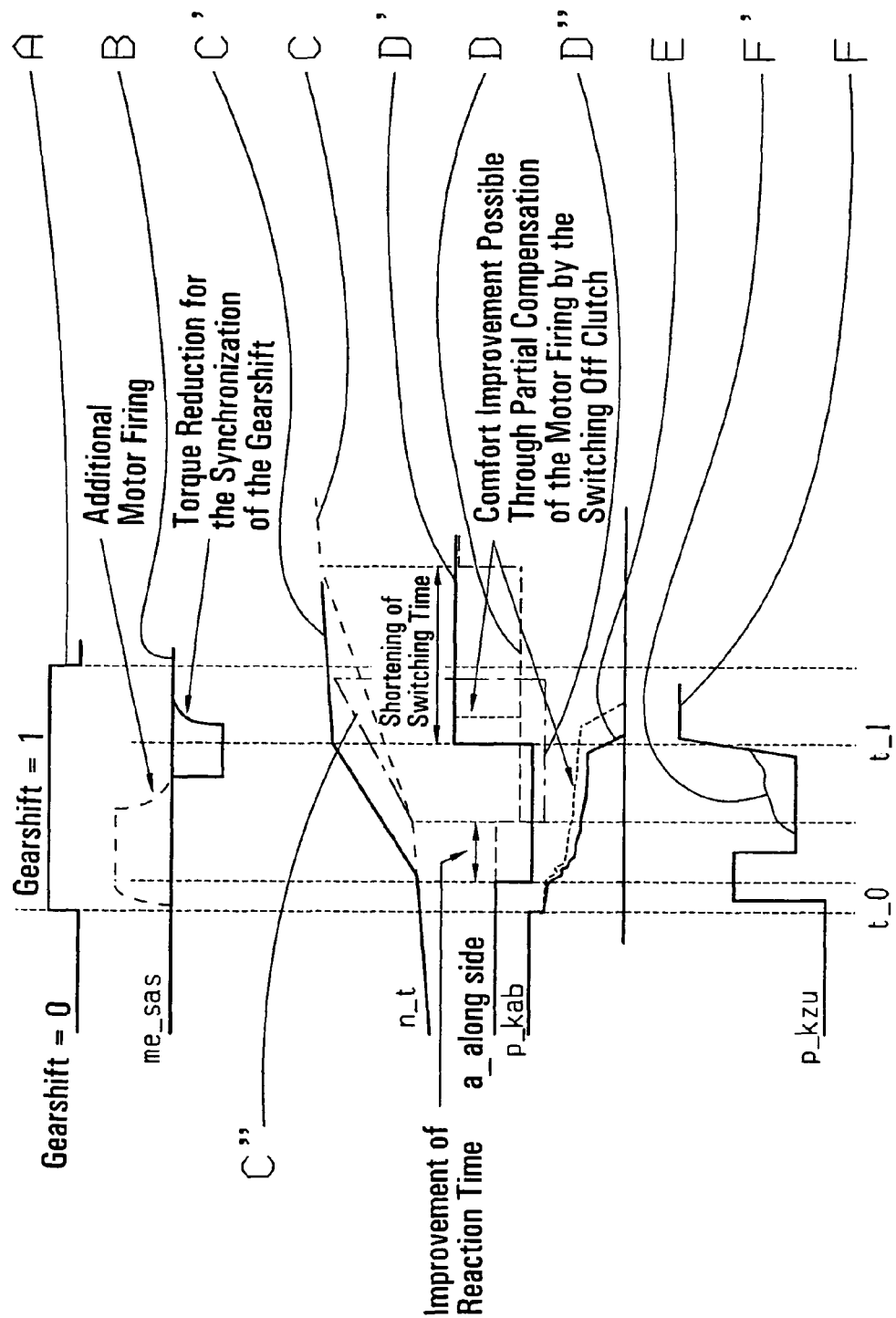
FIG. 2 is a diagram of the process of the revolution speeds and the pressures in a gearshift in the part load operation in accordance with the invention at hand.

This is illustrated in FIG. 2: the motor torque is increased immediately after the switching command for a defined time or rotation speed difference or for a defined time before achievement of the new synchronous point. This results in a faster opening of the disengaging switching element and, consequently, for an improvement in the switching time and for a shortening of the reaction time, as shown in FIG. 2, and also in the comparison between FIGS. 1 and 2. The motor fueling can also occur via the presetting of a set rotation speed to be employed. Furthermore, a subsequent motor torque reduction for the synchronization of the gearshift is portrayed in FIGS. 1 and 2.

Through the motor fueling, according to the invention, an increase of the rotational speed gradient is also obtained. This is illustrated in the comparison of curves C and C' in which curve C' represents the rotational speed progression with motor fueling. As shown in FIG. 2, the reaction of the gearbox input rotational speed n_t occurs substantially earlier in comparison to the state of the art technology. Moreover, the synchronous revolution speed is attained earlier, so that the reaction and switching time is shortened as labeled accordingly in FIG. 2.

According to the invention, if the additional motor fueling actually executed is transferred in the torque input quantities for the clutch to be switched, the engaging clutch can react to an additional motor fueling possibly not executed also for certain reasons and additionally can facilitate the achievement of the synchronous revolution speed through a pressure increase. This is illustrated by the curve F' in FIG. 2. The process of the gearbox input rotational speed n_t appearing through this is denoted by C''. With this process, an improvement in the readiness takes place only through the achieved shortening of the switching time as a result of the steep rotational speed gradient.

Figure 3:
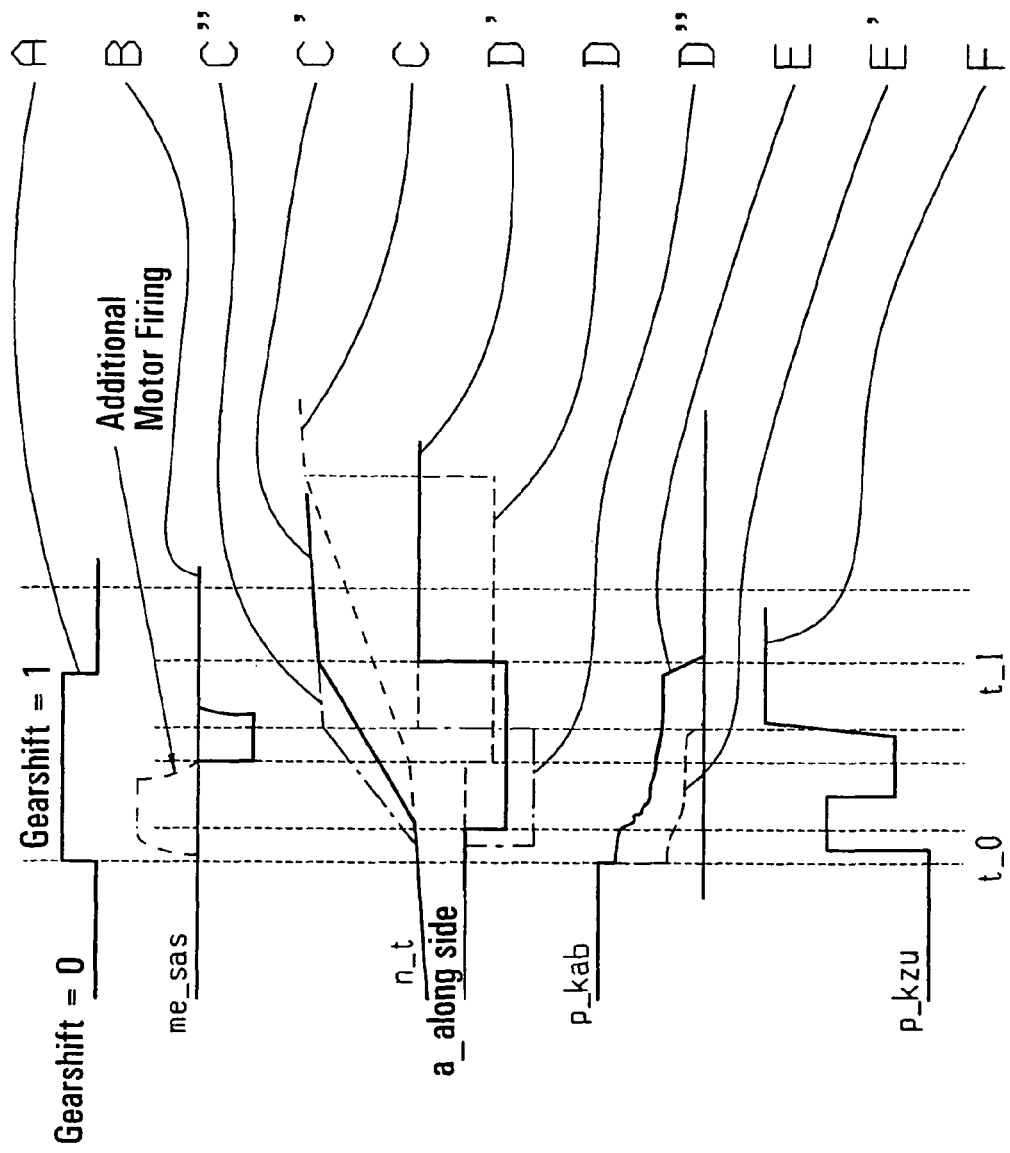
FIG. 3 is a diagram of the process of the revolution speeds and the pressures in a gearshift in the part load operation in accordance with a variant of the invention at hand.

According to the invention, in addition to the motor fueling a pressure backup of the disengaging switching element occurs, as shown in the example of FIG. 3 (curve E'), the pressure is hereby reduced in the disengaging switching element, so that the opening of the same is accelerated. This results also in a shortening of the reaction time and the switching time, as is shown in the comparison of the turbine revolution speed C'''. With C', the revolution speed process is hereby denoted without the additional pressure decline in the disengaging switching element and with C of the corresponding process without motor fueling and pressure decline.

Figure 4:
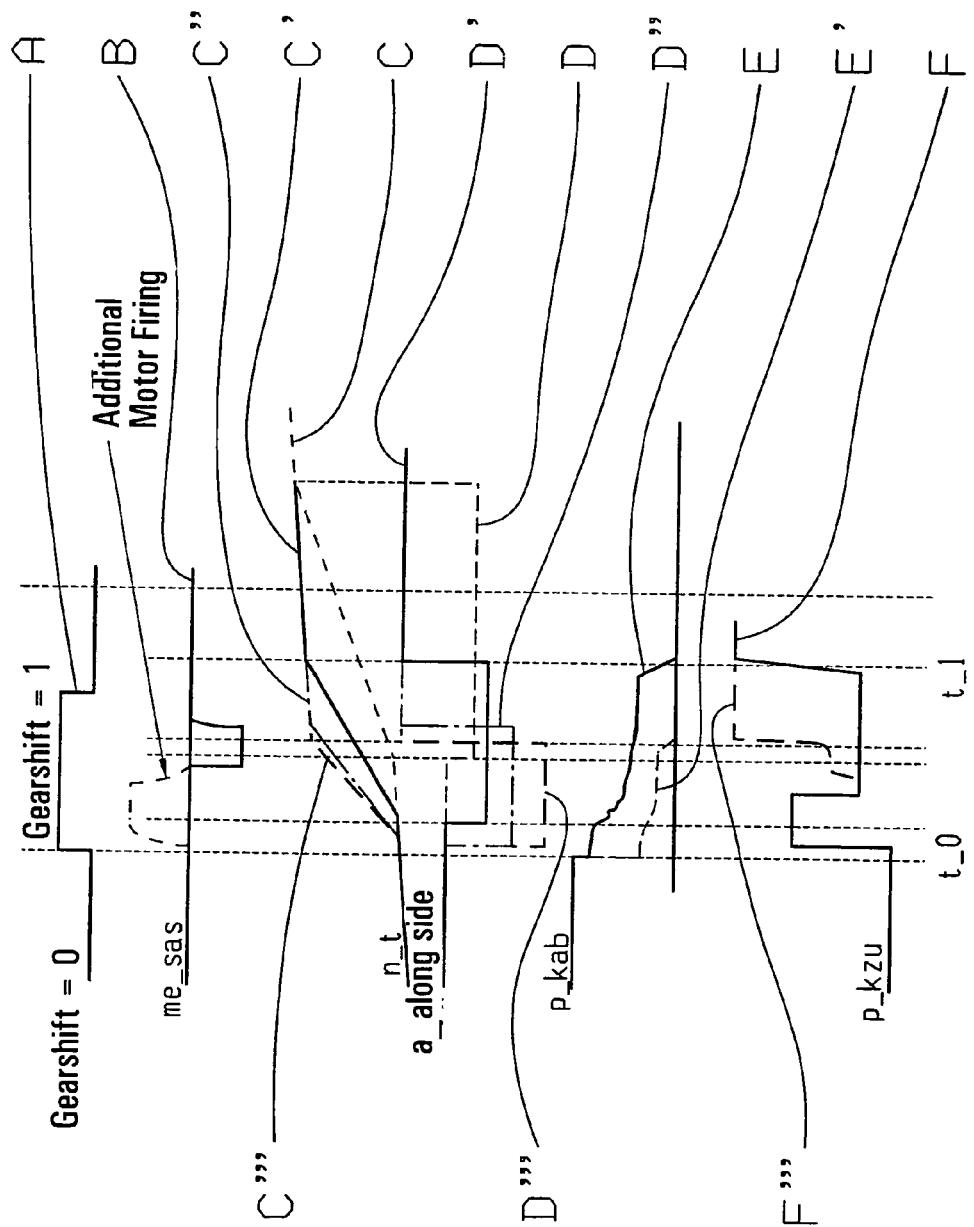
FIG. 4 is a diagram of the process of the revolution speeds and the pressures in a gearshift in the part load operation in accordance with a further variant of the invention at hand.

A further variant of the procedure, according to the invention, for an increase in the readiness, envisions that in addition to the motor fueling, the pressure is reduced in the switching off switching element and the pressure is increased in the engaging switching element, as exemplified in FIG. 4. In this connection, the pressure process of the switching on clutch is represented as curve F'''. Through this measure the reaction time is further reduced and also the synchronous point t_1 is attained earlier as is to be inferred from the revolution speed process C'''.

The invention claimed is:

1. A method of increasing readiness of a crossover gear shift in an automatic transmission, the method comprising the steps of:

attaining at least one of a snatch operation of a disengaging switching element and an increase of the transmission rotational speed gradient by:

issuing a crossover gear shift switching command to the transmission;

transmitting a set transmission rotational speed and a set motor torque from a transmission controller to a motor controller;

actuating a motor fueling to increase fuel supplied to an engine and to increase motor output torque to the automatic transmission immediately after issuing the crossover gear shift switching command depending upon one of the set transmission rotational speed and the set motor torque; and adjusting engagement and disengagement of transmission clutches depending on the increase in fuel supplied to the engine or a resultant increase in the motor output torque to the transmission during the gear shift.

2. The method according to claim 1, further comprising the step of reducing pressure in the disengaging switching element, during the motor fueling, such that the opening of the disengaging switching element is accelerated.

3. The method according to claim 1, further comprising the step of increasing pressure in the engaging switching element during the motor fueling.

4. A method for increasing a spontaneity of an overlapping shifting operation in an automatic transmission, with a command for motor fueling, being given either by a switch command or directly thereafter, at least one of a switching element, being disengaged, is forced open and a rotational speed gradient (turbine rotational speed) is increased by the motor fueling, the motor fueling occurring by setting either a rotational speed or a motor torque to be utilized by the automatic transmission, and the command for motor fueling being given by a transmission controller, the method comprising the step of:

carrying out the motor fueling up to a maximum attainable full-load characteristic curve by setting the rotational speed and the engine torque to be utilized by the automatic transmission as a function of a desired increase in spontaneity; and monitoring of the switching element, which maintains the rotational speed at an old synchronous rotational speed, to prevent undesired transmission of an additional demand for motor fueling to an output, the opening of the switching element taking place up to a defined time after a start of the additional demand for motor fueling and, subsequently, setting a corresponding rotational speed gradient in a direction of a new synchronous rotational speed.

5. The method according to claim 4, further comprising the step of monitoring whether a rotational speed difference with respect to the new synchronous rotational speed reduces constantly and to a certain degree.

6. The method according to claim 4, further comprising the step of, after the new synchronizing rotational speed is attained, terminating continuation of the additional motor fueling beyond a certain duration of time if a further shifting operation is not initiated.

7. The method according to claim 4, further comprising the step of forming torque signals, for either different parts of the shifting operation or the switching element being disengaged and a switching element being engaged, differently in one of a motor controller or the transmission controller, and transmitting the formed torque signals to the other of the motor controller or the transmission controller.

8. The method according to claim 7, further comprising the step of foregoing additional motor fueling during disengaging of the switching element.

9. The method according to claim 7, further comprising the step of either transferring additional motor fueling for disengaging the switching element being disengaged while engaging the switching element being engaged by a pressure control of both switching elements or considering the additional motor fueling during engaging the switching element being engaged by the pressure control of the switching element being engaged.

10. The method according to claim 4, further comprising the step of, in addition to the motor fueling, reducing a pressure at the switching element being disengaged in order to accelerate opening of the switching element.

11. The method according to claim 4, further comprising the step of, in addition to the motor fueling, increasing a pressure at the switching element being engaged in order to reduce interruption in acceleration at a drive output of the automatic transmission.

12. The method according to claim 4, further comprising the step of, in addition to the motor fueling, increasing a pressure at a switching element being engaged.

13. A method for increasing a spontaneity of an overlapping shifting operation in an automatic transmission, the method comprising the steps of;

issuing an overlapping switching command to a transmission controller;

transmitting a command from a transmission controller to a motor controller for increasing motor fueling directly after transmission of the overlapping switching command;

setting a transmission rotational speed and a motor output torque as a function of a desired increase in spontaneity;

fueling the motor depending on either the set transmission rotational speed or the set motor output torque to be utilized by the automatic transmission;

fueling the motor up to a maximum attainable full-load characteristic curve; and at least one of forcing open a switching element being disengaged and increasing a transmission rotational speed gradient (turbine rotational speed) by the fueling of the motor.

14. The method according to claim 13, further comprising the step of fueling the motor without altering clutch pressure.

15. The method according to claim 13, further comprising the step of increasing the motor fueling depending upon either the set transmission rotational speed or the set motor torque to increase the motor output torque to be utilized by the transmission, and adjusting the disengagement of the switching element depending on either the increase in the motor fueling or a resultant increase in the motor output torque to be utilized by the automatic transmission.

* * * * *